(12) United States Patent
Motoki et al.

(10) Patent No.: US 8,278,852 B2
(45) Date of Patent: Oct. 2, 2012

(54) MOTOR DRIVING CIRCUIT

(75) Inventors: Yoshito Motoki, Isesaki (JP); Yuji Uchiyama, Ora-gun (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 288 days.

(21) Appl. No.: 12/649,146

(22) Filed: Dec. 29, 2009

(65) Prior Publication Data

US 2010/0176758 A1     Jul. 15, 2010

(30) Foreign Application Priority Data

Jan. 9, 2009   (JP) .................. 2009-003940

(51) Int. Cl.
    *H02P 6/14* (2006.01)
(52) U.S. Cl. .............. 318/400.13; 318/700; 318/400.29; 318/400.26; 318/400.01
(58) Field of Classification Search ............. 318/400.13, 318/400.29, 400.01, 400.26, 700
    See application file for complete search history.

(56) References Cited

U.S. PATENT DOCUMENTS 4,947,309 A * 8/1990 Jonsson .................... 363/17
7,142,436 B1 * 11/2006 Chen et al. ............... 318/400.29
7,457,136 B2 * 11/2008 Ozaki ........................... 363/17

FOREIGN PATENT DOCUMENTS

JP     2005-184897     7/2005

* cited by examiner

*Primary Examiner* — Walter Benson
*Assistant Examiner* — David Luo
(74) *Attorney, Agent, or Firm* — SoCal IP Law Group LLP; Steven C. Sereboff; John E. Gunther

(57) ABSTRACT

A motor-driving-circuit comprising: a first to-fourth-transistors; a drive-control-circuit to control a energization-state of a motor coil so as to be a driving-state where either one group of groups of the first-and-fourth-transistors and the second-and-third-transistors is on and the other group is off, or so as to be a regeneration-state where the first-and-third-transistors are off and the second-and-fourth-transistors are on; a set-current-detection-circuit; an overcurrent-detection-circuit; and an overcurrent-protection-circuit to output a regeneration-instruction-signal for shifting the energization-state to the regeneration-state if an overcurrent-state does not occur and output a drive-stop-signal for stopping driving the coil if the overcurrent-state occurs, when a current amount flowing through the coil has reached a set-level in the driving-state, the drive-control-circuit shifting the energization-state to the regeneration-state to be maintained for a predetermined time period and thereafter returning the energization-state to the driving-state when the regeneration-instruction-signal is output, and turning off the first-to-fourth-transistors when the drive-stop-signal is output.

3 Claims, 5 Drawing Sheets

US 8,278,852 B2

MOTOR DRIVING CIRCUIT

CROSS-REFERENCE TO RELATED APPLICATION

This application claims the benefit of priority to Japanese Patent Application No. 2009-3940, filed Jan. 9, 2009, of which full contents are incorporated herein by reference.

BACKGROUND OF THE INVENTION

1. Field of the Invention

The present invention relates to a motor driving circuit.

2. Description of the Related Art

Some motor driving circuits may keep the amounts of currents flowing through motor coils at set levels by controlling on and off of transistors connected to the motor coils (Japanese Patent Application Laid-Open Publication No. 2005-184897). For example, in a motor driving circuit shown in FIG. 5, an energization state of a motor coil M connected between terminals T1 and T2 is controlled by on and off of N-channel MOSFETs 110 to 113 making up an H-bridge. For example, in a drive control circuit 120, the N-channel MOSFETs 110 and 113 are turned on and the N-channel MOSFETs 111 and 112 are turned off, so that the circuit passes the current through a path of the N-channel MOSFET 110, the motor coil M, and the N-channel MOSFET 113, to drive the motor (driving state). The amount of the current flowing through the motor coil M is detected by a resistor R connected via a terminal T3 and when the amount of the current flowing through the motor coil M reaches the set level, the drive control circuit 120 turns off the N-channel MOSFET 110 and turns on the N-channel MOSFET 111. As a result, the current, which the motor coil M tries to continue passing, is regenerated by a loop of the N-channel MOSFET 111, the motor coil M, and the N-channel MOSFET 113, and decreases gradually (regeneration state). As such, the drive control circuit 120 is capable of maintaining the amount of the current flowing through the motor coil M at the set level by repeating the driving state and the regeneration state.

Incidentally, in the motor driving circuit, a load may be short-circuited due to aged deterioration of the motor, for example. In the motor driving circuit shown in FIG. 5, if the load is short-circuited, an overcurrent occurs in a case where the energization state of the motor coil M is the driving state, and if the overcurrent is over the set level of the current flowing through the motor coil M, the drive control circuit 120 changes the energization state of the motor coil M to the regeneration state. Then, after elapse of a predetermined time, the drive control circuit 120 changes the energization state of the motor coil M to the driving state, and the driving state and the regeneration state are repeated despite the load is short-circuited. Since the motor driving circuit is generally provided with an overheat protection function, circuit operation stops before causing circuit failure even if the driving state and the regeneration state are repeated in a state where the load is short-circuited. It is desirable, however, to detect a short circuit of the load and protect the circuit before it becomes in such an overheated state.

SUMMARY OF THE INVENTION

A motor driving circuit according to an aspect of the present invention, comprises: a first transistor on a power source side and a second transistor on a ground side connected in series; a third transistor on the power source side and a fourth transistor on the ground side connected in series; a drive control circuit configured to control a energization state of a motor coil so as to be a driving state where either one group of a group of the first and fourth transistors and a group of the second and third transistors is on and the other group is off, or so as to be a regeneration state where the first and third transistors are off and the second and fourth transistors are on, the motor coil connected to a connection point of the first and second transistors and a connection point of the third and fourth transistors; a set current detection circuit configured to detect whether an amount of current flowing through the motor coil has reached a set level; an overcurrent detection circuit configured to detect an overcurrent state where an amount of current flowing through any of the first to fourth transistors is over a predetermined amount of current; and an overcurrent protection circuit configured to output a regeneration instruction signal for shifting the energization state to the regeneration state in a case where the overcurrent state does not occur and output a drive stop signal for stopping driving the motor coil in a case where the overcurrent state occurs, when the amount of current flowing through the motor coil has reached the set level in the driving state, the drive control circuit shifting the energization state to the regeneration state to be maintained for a predetermined time period and thereafter returning the energization state to the driving state when the regeneration instruction signal is output, and turning off the first to fourth transistors when the drive stop signal is output.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
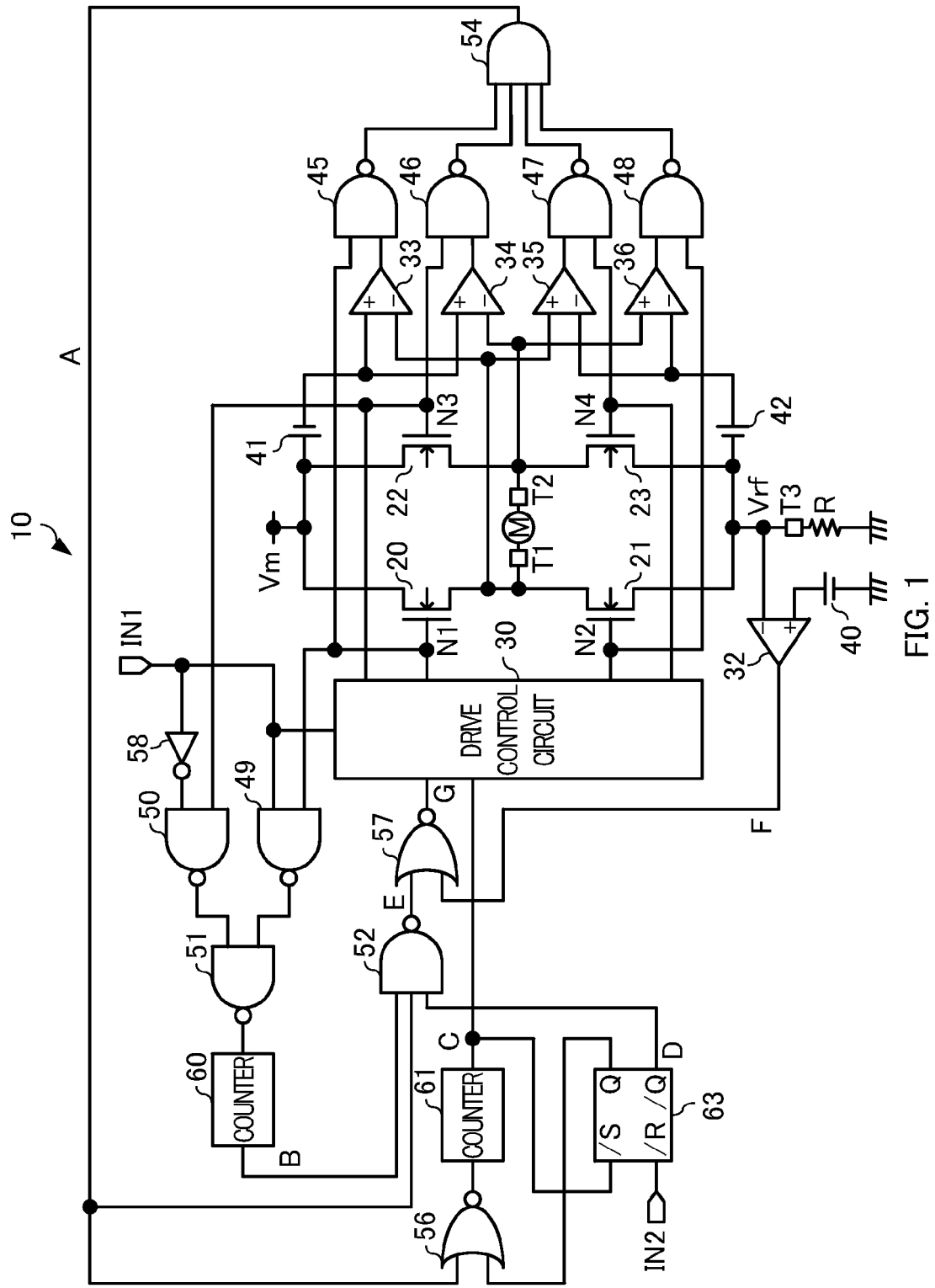
FIG. 1 is a diagram of a configuration of a motor driving circuit according to an embodiment of the present invention.

At least the following details will become apparent from descriptions of this specification and of the accompanying drawings. FIG. 1 is a diagram of a configuration of a motor driving circuit 10 according to an embodiment of the present invention. The motor driving circuit 10 includes N-channel MOSFETs 20 to 23, a drive control circuit 30, comparators 32 to 36, reference sources 40 to 42, NAND circuits 45 though 52, an AND circuit 54, NOR circuits 56 and 57, a NOT circuit 58, counters 60 and 61, and a SR flip-flop 63.

The N-channel MOSFETs 20 to 23 make up an H-bridge circuit, and a motor coil M is connected, via terminals T1 and T2, between a connection point of the N-channel MOSFET 20 (first transistor) and the N-channel MOSFET 21 (second transistor) and a connection point of the N-channel MOSFET 22 (third transistor) and the N-channel MOSFET 23 (fourth transistor). The motor coil M is a DC motor coil, for example, and current flows through the motor coil M in a direction from the terminal T1 to the terminal T2 so as to rotate a motor in a positive direction (positive rotation) and the current flows through the motor coil M in a direction from the terminal T2 to the terminal T1 so as to rotate the motor in a reverse direction (reverse rotation).

The drive control circuit 30 controls on and off of the N-channel MOSFETs 20 to 23 so that the amount of the current flowing through the motor coil M reaches a set level, according to the direction of the motor rotation. For example, in the case of the positive rotation, the drive control circuit 30 firstly turns on the N-channel MOSFETs 20 and 23 and turns off the N-channel MOSFETs 21 and 22. Thus, the current flows through a path of the N-channel MOSFET 20, the motor coil M, and the N-channel MOSFET 23. A state in which the current flows through this path is referred to as a driving state. When the amount of the current flowing through the motor coil M reaches a set level, the drive control circuit 30 turns off the N-channel MOSFET 20 and turns on the N-channel MOSFET 21. Thus, the current flowing through the motor coil M is regenerated in a loop of the N-channel MOSFET 21, the motor coil M, and the N-channel MOSFET 23. A state in which the current flows through this path is referred to as a regeneration state. In the case of the reverse rotation, the current flows through the path of the N-channel MOSFET 22, the motor coil M, and the N-channel MOSFET 21 in the driving state, and the current flows in the loop of the N-channel MOSFET 23, the motor coil M, and the N-channel MOSFET 21 in the regeneration state. Furthermore, when detecting overcurrent caused by a short circuit to a high voltage point, a short circuit to ground, or a short circuit of a load, the drive control circuit 30 turns off all of the N-channel MOSFETs 20 to 23.

The comparator 32 is a circuit for detecting whether the amount of the current flowing through the motor coil M has reached the set level when the motor coil M is in the driving state. Specifically, the comparator 32 outputs a comparison result of a voltage Vrf generated by the current flowing through a resistor R connected via the terminal T3 and a reference voltage Vref1 according to the set level output from the reference source 40.

The comparator 33 and the NAND circuit 45 make up an overcurrent detection circuit for detecting whether the current flowing through the N-channel MOSFET 20 is the overcurrent. In an embodiment according to the present invention, a voltage Vm-Vref2 that is lower by a reference voltage Vref2 of the reference source 41 than the power source Vm is applied to a positive input terminal of the comparator 33. A negative input terminal of the comparator 33 is connected to the source of the N-channel MOSFET 20. Therefore, in a state where a signal N1 goes high and the N-channel MOSFET 20 is turned on, if the overcurrent occurs in the N-channel MOSFET 20 due to the short circuit of the terminal T1 to the ground or occurrence of the short circuit of the load, for example, a voltage drop occurs in the N-channel MOSFET 20 becomes greater than Vref2, the output of the comparator 33 goes high, and the output of the NAND circuit 45 goes low. Similarly, the comparator 34 and the NAND circuit 46 make up an overcurrent detection circuit for detecting whether the current flowing through the N-channel MOSFET 22 is the overcurrent.

The comparator 35 and the NAND circuit 47 make up an overcurrent detection circuit for detecting whether the current flowing through the N-channel MOSFET 21 is not overcurrent. In an embodiment according to the present invention, the positive input terminal of the comparator 35 is connected to the drain of the N-channel MOSFET 21 and the negative input terminal of the comparator 35 is applied with a voltage which is higher by a reference voltage Vref3 of the reference source 42 than the voltage of the source of the N-channel MOSFET 21. Therefore, in a state where a signal N2 goes high and the N-channel MOSFET 21 is turned on, if the overcurrent occurs in the N-channel MOSFET 21 due to the short-circuit of the terminal T1 to a high voltage point, for example, the voltage drop occurs in the N-channel MOSFET 21 becomes greater than Vref3, the output of the comparator 35 goes high, and the output of the NAND circuit 47 goes low. Similarly, the comparator 36 and the NAND circuit 48 make up an overcurrent detection circuit for detecting whether the current flowing through the N-channel MOSFET 23 is the overcurrent.

The output signals of the NAND circuits 45 to 48 are input to the AND circuit 54. Therefore, if the overcurrent occurs in any of the N-channel MOSFETs 20 to 23, then any of the outputs of the NAND circuits 45 to 48 goes low so that the output of the AND circuit 54 goes low.

To the NAND circuit 49, the signal N1 to be input to the gate of the N-channel MOSFET 20 and a signal for instructing the positive rotation or reverse rotation, which is input from an input terminal IN1, are input. To the NAND circuit 50, the signal N3 to be input to the gate of the N-channel MOSFET 22 and a signal obtained by inverting by the NOT circuit 58 the signal input from an input terminal IN1 are input. In an embodiment according to the present invention, the signal input from the input terminal IN1 goes high in the case of the positive rotation and goes low in the case of the reverse rotation. Therefore, in the case of the positive rotation, the output of the NAND circuit 50 is always high and the output of the NAND circuit 49 is low only during a time period in which the signal N1 is high. Similarly, in the case of the reverse rotation, the output of the NAND circuit 49 is always high and the output of NAND circuit 50 is low only during a time period in which the signal N3 is high. Since the output signals of the NAND circuits 49 and 50 are input to the NAND circuit 51, the output of the NAND circuit 51 is high when the energization state of the motor coil M is the driving state, in either case of the positive rotation or the reverse rotation.

The counter 60 (minimum time count circuit) is a circuit for counting the minimum time of a time during which the energization state of the motor coil M is the driving state. In an embodiment of the present invention, when the energization state of the motor coil M becomes the driving state, the output of the NAND circuit 51 goes high. Therefore, the counter 60 starts counting when the output of the NAND circuit 51 goes high, and changes the level of the output signal to the high level when a count value reaches a value corresponding to the minimum time. The count value of the counter 60 is reset when the output of the NAND circuit 51 goes low.

The counter 61 is a circuit for counting a mask time from a time when the overcurrent is detected until a time when a state is shifted to a protective state. In an embodiment of the present invention, the output signal of the AND circuit 54 and the output signal from an output terminal Q of the SR flip-flop 63 are input to the NOR circuit 56, and when both of these two signals go low, the output of the NOR circuit 56 goes high. The counter 61 starts counting when the output of the NOR circuit 56 goes high and changes the level of its output signal to the low level when a count value reaches a value corresponding to the mask time. The count value of the counter 61 is reset when the output of the NOR circuit 56 goes low before the count value reaches the value corresponding to the mask time. When the output signal of the counter 61 goes low, the drive control circuit 30 determines the presence of the overcurrent state and turns off all of the N-channel MOSFETs 20 to 23. Here, the low-level signal output from the counter 61 is one example of a drive stop signal.

In the SR flip-flop 63, the output signal of the counter 61 is input to the inverting set terminal /S thereof and the signal input from the input terminal IN2 is input to its inverting reset terminal /R thereof. Therefore, when the signal input to the inverting set terminal /S goes low, the signal output from the output terminal Q goes high and the signal output from the inverting output terminal /Q goes low, and when the signal input to the inverting reset terminal /R goes low, the signal output from the output terminal Q goes low and the signal output from the inverting output terminal /Q goes high. The signal input from the input terminal IN2 goes low at the time of start-up of the motor driving circuit 10 and thereafter maintains the high level. Therefore, the signals output from the output terminal Q and the inverting output terminal /Q of the SR flip-flop 63 are low and high, respectively, at the initial state. Thereafter, when the signal output from the counter 61 goes low, the signals output from the output terminal Q and the inverting output terminal /Q of the SR flip-flop 63 go high and low, respectively.

The output signal of the counter 60, the output signal of the AND circuit 54, and the signal output from the inverting output terminal /Q of the SR flip-flop 63 are input to the NAND circuit 52. Therefore, only when all of these three signals are high, the output signal of the NAND circuit 52 goes low. The signal output from the NAND circuit 52 and the signal output from the comparator 32 are input the NOR circuit 57. Therefore, only when both of these two signals are low, the signal output from the NOR circuit 57 goes high. When the signal output from the NOR circuit 57 goes high in a case where the energization state of the motor coil M is the driving state, the drive control circuit 30 changes the energization state to the regeneration state. Here, the high-level signal output from the NOR circuit 57 is one example of a regeneration instruction signal.

The circuit including the NAND circuits 49 to 52, the NOR circuits 56 and 57, the NOT circuit 58, the counters 60 and 61, and the SR flip-flop 63 correspond to one example of an overcurrent protection circuit.

Figure 2:
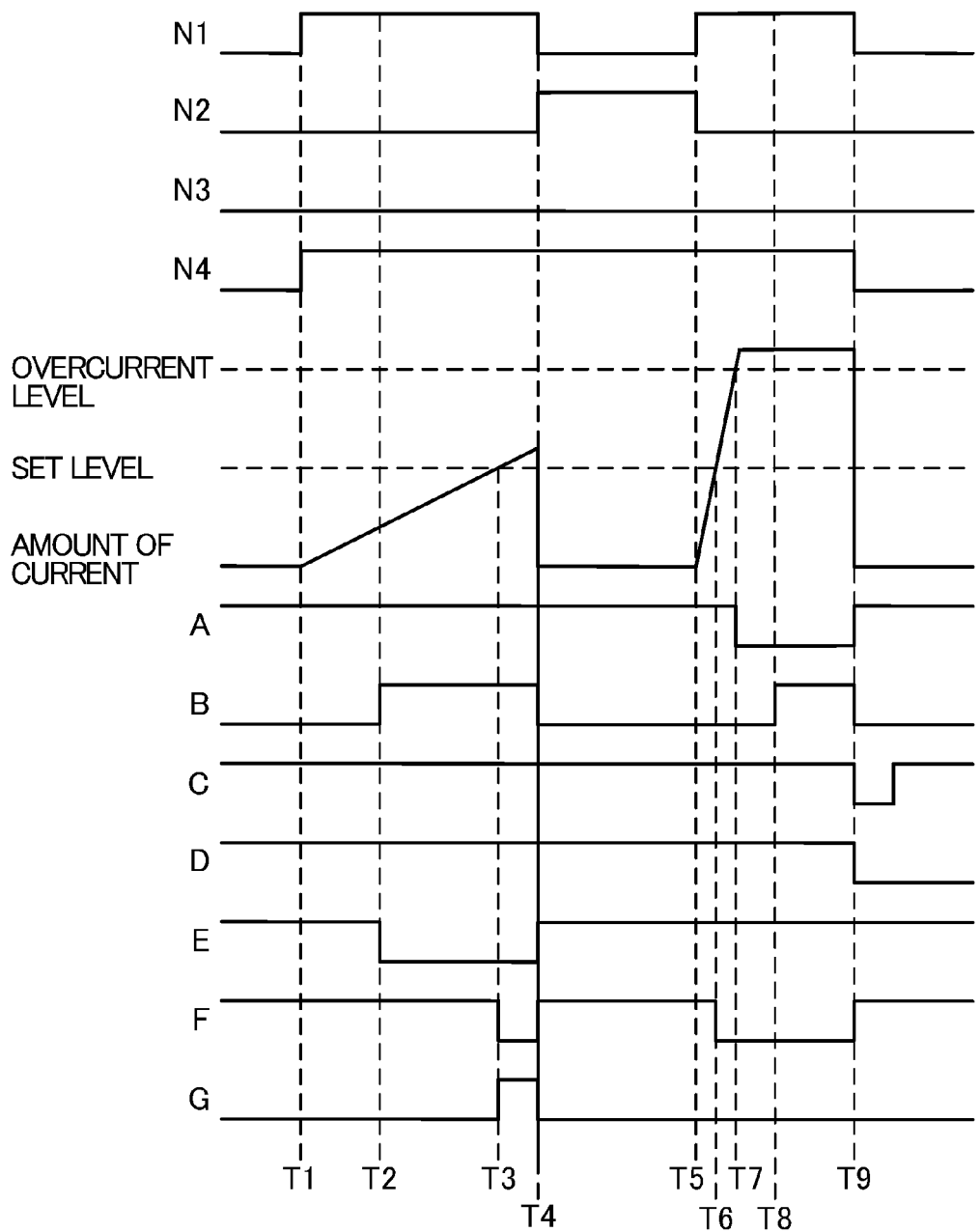
FIG. 2 is a timing chart of one example of an operation when a load is short-circuited.

FIG. 2 is a timing chart of one example of an operation when the load is short-circuited. It is assumed that the short circuit of the load does not occur in the initial state. At the beginning, all of the signals N1 to N4 input to the gates of the N-channel MOSFETs 20 to 23 are low and the N-channel MOSFETs 20 to 23 are off.

Thereafter, at a time T1, when the signals N1 and N4 go high, the energization state of the motor coil M is changed to the driving state and the amount of the current flowing though the motor coil M increases. When the signal N1 goes high, the counter 60 starts counting; and at a time T2, when a count value reaches a value corresponding to the minimum time of the driving state at a time T2, the signal B output from the counter 60 goes high. At this time, since the overcurrent does not occur, the signal A output from the AND circuit 54 is high, and since the SR flip-flop 63 is in the initial reset state, the signal D output from the inverting output terminal /Q is also high. Therefore, all of the signals A, B, and D input to the NAND circuit 52 are high and the signal E output from the NAND circuit 52 is changed to the low level.

Thereafter, the amount of the current flowing through the motor coil M continues to increase and at a time T3, when it reaches the set level set by the power source 40, the signal F output from the comparator 32 is changed to the low level. At this time, since the signal E is also low, both of the signals E and F input to the NOR circuit 57 are low and the signal G output from the NOR circuit 57 is changed to the high level.

When the signal G goes high, the drive control circuit 30 determines that the amount of the current flowing through the motor coil M has reached the set level, and at a time T4, allows the signal N1 to be changed to the low level and the signal N2 to be changed the high level, and thus, the energization state of the motor coil M is changed to the regeneration state. Due to the signal N1 being changed to the low level, the counter 60 is reset and the signal B is changed to the low level. Due to the signal B being changed to the low level, the signal E goes high and the signal G goes low.

After elapse of a predetermined time of the regeneration state, the drive control circuit 30 allows the signal N1 to be changed to the high level and the signal N2 to be changed to the low level at a time T5. Thus, the energization state of the motor coil M is changed again to the driving state. At this time, if it is assumed that the short circuit of the load occurs, the amount of the current flowing through the motor coil M rapidly increases. At a time T6, when the amount of the current flowing through the motor coil M reaches the set level, the signal F is changed to the low level. Furthermore, the short circuit of the load causes the overcurrent in the N-channel MOSFET 20 or the N-channel MOSFET 23, and thus the signal A is changed to the low level at time T7.

When the signal N1 goes high, the counter 60 starts counting and the signal B is changed to the high level at a time T8. At this time, out of the signals A, B, and D input to the NAND circuit 52, the signals B and D are high, however, the signal A is low due to the occurrence of the overcurrent. Therefore, the signal E remains high and the signal G remains low. As a result, although the amount of the current flowing through the motor coil M has reached the set level, the signal G remains low, and thus, the drive control circuit 30 keeps the energization state of the motor coil M in the driving state.

When the signal A goes low, the signal output from the NOR circuit 56 goes high and the counter 61 starts counting. Thereafter, at a time T9, when the count value of the counter 61 reaches the count value corresponding to the mask time, the signal C is changed to the low level. When the signal C goes low, the drive control circuit 30 determines that the signal A is low because of the occurrence of the overcurrent not because of the effect of the noises, etc., and allows all of the signals N1 to N4 to be changed to the low level. As a result, the motor coil M stops driving and the overcurrent state is eliminated.

Figure 3:
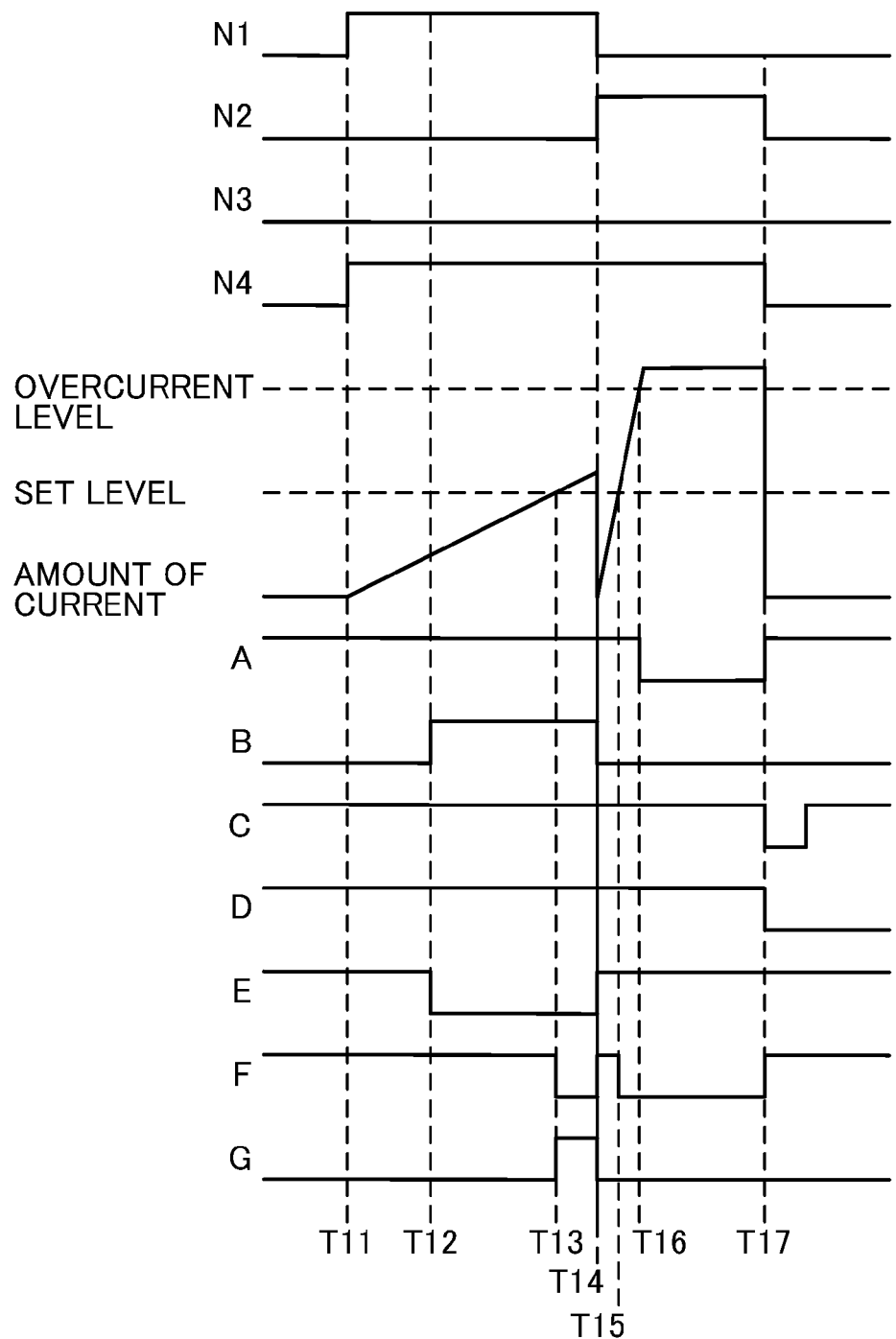
FIG. 3 is a timing chart of one example of an operation when a short circuit to a high voltage point occurs.

FIG. 3 is a timing chart of one example of an operation when the short circuit to the high voltage point occurs. Here, it is assumed that the terminal T1 is short-circuited to the high voltage point. In the initial state, all of the signals N1 to N4 are low and the drive control circuit 30 allows the signals N1 and N4 to be changed to the high level at a time T11. Thus, the energization state of the motor coil M is changed to the driving state. As in the case of FIG. 2, the signal B goes high and the signal E goes low at a time T12 and the signal F goes low and the signal G goes high at a time T13.

When the signal G goes high, the drive control circuit 30 allows the signal N1 to be changed to the low level and the signal N2 to the high level at a time T14, as in the case of FIG. 2. As a result, the N-channel MOSFET 21 is turned on, however, since the terminal T1 is short-circuited to the high voltage point, the overcurrent occurs in the N-channel MOSFET 21. Therefore, the signal F goes low at a time T15 and the signal A goes low at a time T16. After elapse of the mask time from the time T16, the signal C is changed to the low level at a time T17. As at result, the drive control circuit 30 allows the signals N1 to N4 to be changed to the low level and the overcurrent state is eliminated.

Figure 4:
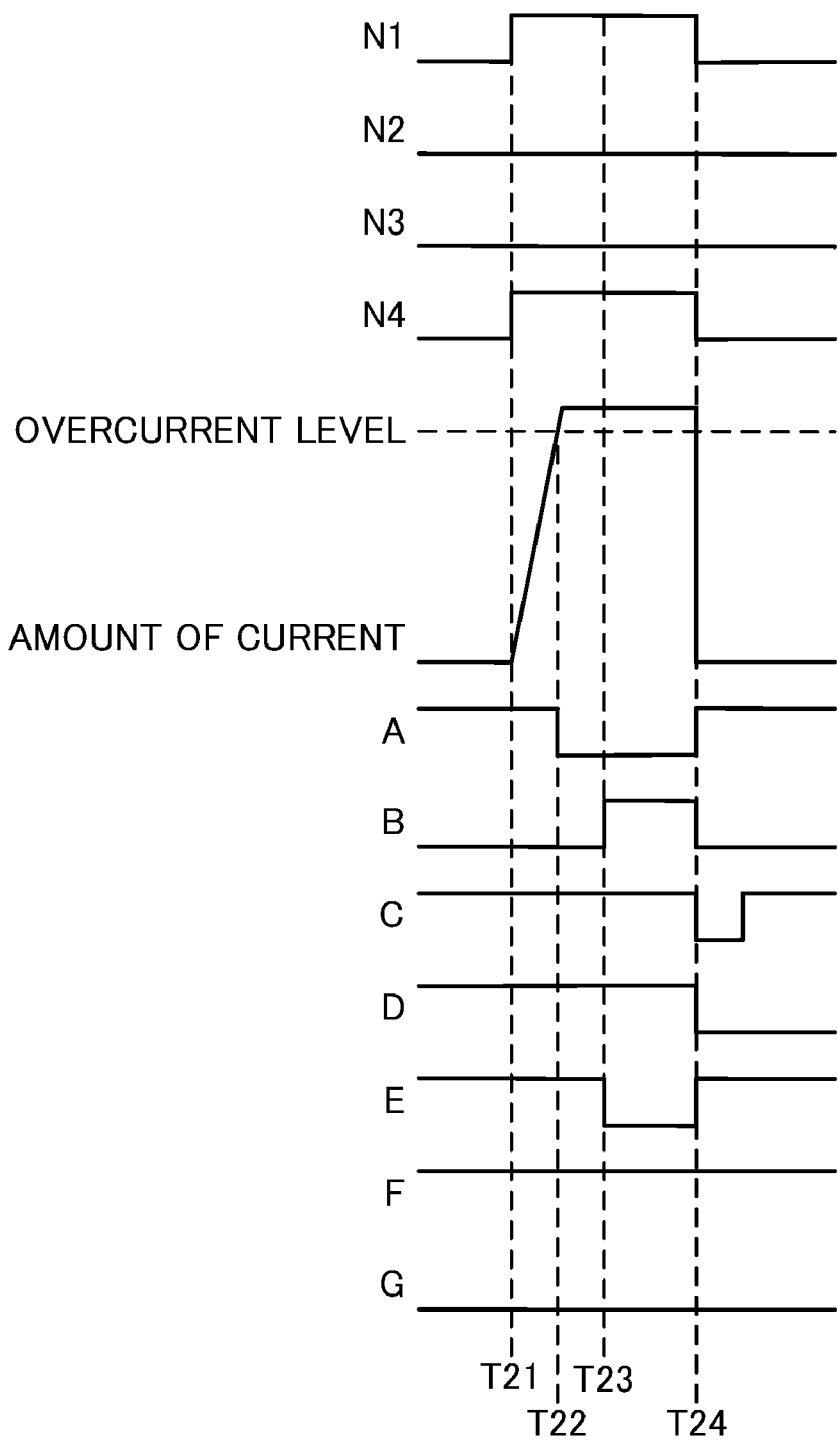
FIG. 4 is a timing chart of one example of an operation when a short circuit to ground occurs.
Figure 5:
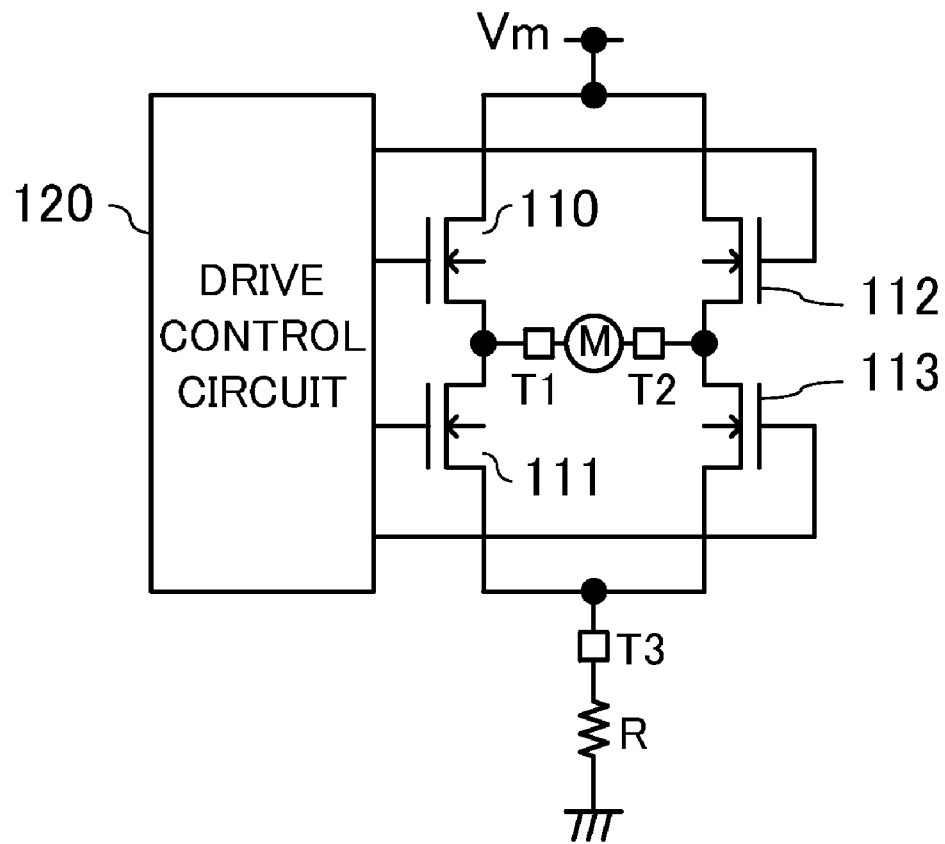
FIG. 5 is a diagram of a configuration example of a general motor driving circuit.

FIG. 4 is a timing chart of one example of an operation when the short circuit to the ground occurs. Here, it is assumed that the terminal T1 is short-circuited to the ground. In the initial state, all of the signals N1 to N4 are low, and at a time T21, the drive control circuit 30 allows the signals N1 and N4 to be changed to the high level. As a result, the N-channel MOSFET 20 is turned on, however, since the terminal T1 is short-circuited to the ground, the overcurrent occurs in the N-channel MOSFET 20. At this time, the signal F remains high since no current flows through the resistor R, however, the signal A is changed to the low level at a time T22 since the overcurrent occurs in the N-channel MOSFET 20.

Thereafter, as in the case of FIG. 2, the signal B is changed to the high level and the signal E is changed to the low level at a time 23. Then, when the mask time has passed since the signal A went low, the signal C is changed to the low level at a time T24. As a result, the drive control circuit 30 allows all of the signals N1 to N4 to be changed to the low level and the overcurrent state is eliminated.

As above, in the motor driving circuit 10 according to an embodiment of the present invention, when the amount of the current flowing through the motor coil M has reached the set level, the energization state of the motor coil M is shifted to the regeneration state in the case where the overcurrent does not occur, and the energization state is not changed to the regeneration state but the overcurrent protection function is performed in the case where the overcurrent occurs. Therefore, when the load is short-circuited, there is no repetition of the driving state and the regeneration state, and thus safety when the load is short-circuited may be improved. In the motor driving circuit 10, the overcurrent protection function is performed not only in the case of the short circuit of the load but also in the case of the short circuit to the high voltage point and the short circuit to the ground.

In the motor driving circuit 10, the mask time of the overcurrent is set by the counter 61. Therefore, it becomes possible to control stop of the drive of the motor coil M, when noise is caused in the signal A, for example.

In the motor driving circuit 10, the minimum time in the driving state is set by the counter 60, and even in such a configuration, the overcurrent protection function may appropriately be performed in any case of the short circuit of the load, the short circuit to the high voltage point, or the short circuit to the ground.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor driving circuit comprising:
a first transistor on a power source side and a second transistor on a ground side connected in series;
a third transistor on the power source side and a fourth transistor on the ground side connected in series;
a drive control circuit configured to control a energization state of a motor coil so as to be a driving state where either one group of a group of the first and fourth transistors and a group of the second and third transistors is on and the other group is off, or so as to be a regeneration state where the first and third transistors are off and the second and fourth transistors are on, the motor coil connected to a connection point of the first and second transistors and a connection point of the third and fourth transistors;
a set current detection circuit configured to detect whether an amount of current flowing through the motor coil has reached a set level;
an overcurrent detection circuit comprising first, second, third, and fourth comparators coupled respectively to the first, second, third, and fourth transistors, each comparator configured to compare a voltage drop across the respective transistor to a respective reference voltage to detect an overcurrent state where an amount of current flowing through any of the first to fourth transistors is over a predetermined amount of current; and
an overcurrent protection circuit configured to output a regeneration instruction signal for shifting the energization state to the regeneration state in a case where the overcurrent state does not occur and output a drive stop signal for stopping driving the motor coil in a case where the overcurrent state occurs, when the amount of current flowing through the motor coil has reached the set level in the driving state,
the drive control circuit shifting the energization state to the regeneration state to be maintained for a predetermined time period and thereafter returning the energization state to the driving state when the regeneration instruction signal is output, and turning off the first to fourth transistors when the drive stop signal is output.

2. The motor driving circuit of claim 1, wherein the overcurrent protection circuit outputs the drive stop signal when the overcurrent state has been maintained for a predetermined time period.

3. The motor driving circuit of claim 1, wherein the overcurrent protection circuit includes:
a minimum time count circuit configured to count to measure a minimum time period from a start of the driving state to a shift to the regeneration state; and
a control signal output circuit configured to output the regeneration instruction signal or the drive stop signal based on detection results of the set current detection circuit and the overcurrent detection circuit, after the minimum time period has been measured by counting.

* * * * *